July 13, 1926.
W. V. VAN ETTEN
1,592,680
HEADLIGHT MOUNTING BRACKET
Filed May 28, 1925
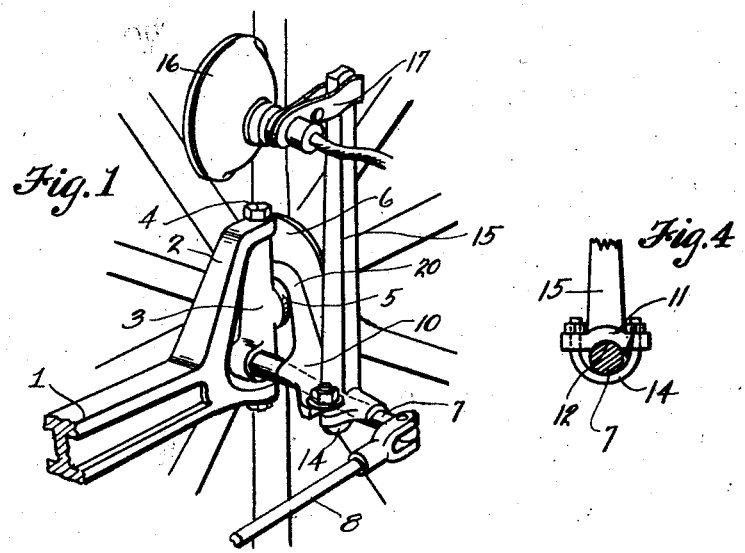
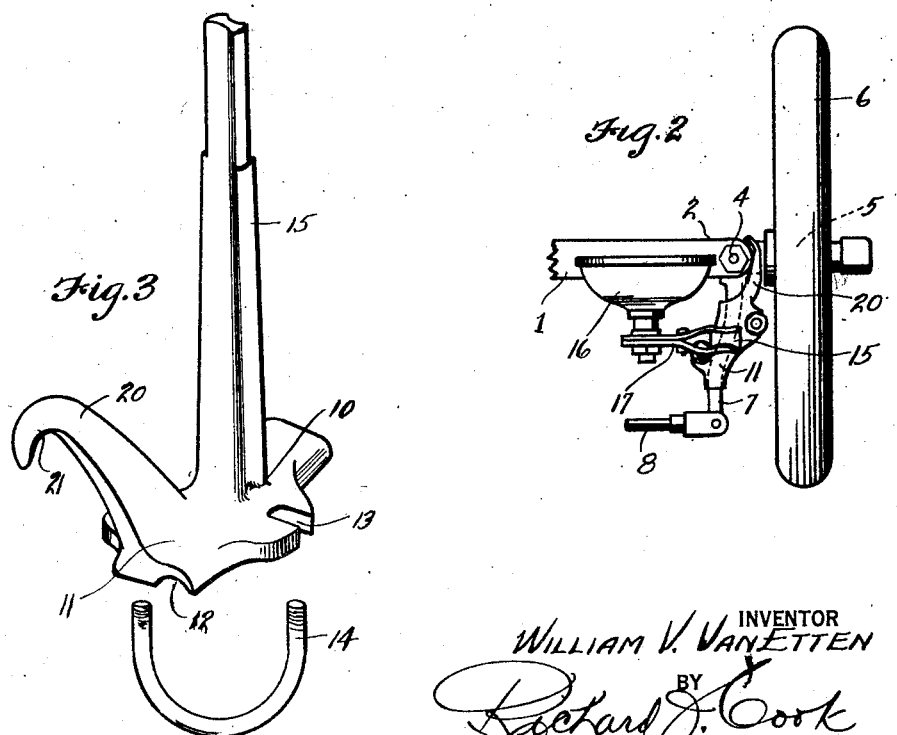
INVENTOR
WILLIAM V. VAN ETTEN
BY
Richard J. Cook
ATTORNEY Patented July 13, 1926.

1,592,680

UNITED STATES PATENT OFFICE.

WILLIAM V. VAN ETTEN, OF EVERETT, WASHINGTON.

HEADLIGHT MOUNTING BRACKET.

Application filed May 28, 1925. Serial No. 33,364.

This invention relates to improvements in headlights for motor vehicles and more particularly to a headlight mounting bracket that is adapted to be fixed to a steering knuckle arm in such manner that the lamp will be shifted in accordance with the direction of travel of the vehicle; the principal object of the present invention being to provide a one piece bracket that may be easily attached or detached and which comprises a vertical post on which the lamp may be adjustably mounted.

Other objects reside in the various details of construction whereby certain advantages are attained and the device is rendered simpler, less expensive and otherwise more convenient for use than the device of my copending application, filed July 14, 1924 under Serial Number 725,848.

In accomplishing these and other objects of the invention, I have provided the improved details of construction, the preferred forms of which are illustrated in the accompanying drawings, wherein—

Figure 1 is a perspective view illustrating the mounting of a lamp bracket embodied by this invention on the steering knuckle of an automobile.

Figure 2 is a plan view of the same parts.

Figure 3 is a perspective view of the bracket removed from the vehicle.

Figure 4 is a detail sectional view through the bracket and steering arm.

Referring more in detail to the several views of the drawings—

1 designates the front axle of an automobile, or similar vehicle, having a yoke 2 at its end between which a steering knuckle 3 is pivotally mounted on the vertical pin 4; the knuckle being of the usual form having a spindle 5 on which a steering wheel 6 is mounted and has a rearwardly extending arm 7 fixed therein which at its end is connected to the steering mechanism by means of the connecting rod 8.

The lamp mounting bracket embodied by this invention, designated in its entirety by the reference character 10, is mounted on the steering arm 7, as shown best in Figure 1. It comprises a base portion 11 provided on its under side with a groove 12 adapted to receive the arm and at opposite sides is provided with slots or openings 13 for receiving the ends of a U bolt 14 whereby the device is clamped rigidly upon the arm. Extended vertically from the base is an integrally formed post 15 on which a head light 16 is mounted by means of a clamp 17; the latter being adjustable on the post to support the head light at a desirable height.

In order to add rigidity to the mounting and to prevent turning or tilting of the same on account of looseness caused by continuous vibration or jar incidental to travel, I have provided the base portion 11 with an integrally cast arm 20 that extends upwardly and forwardly and has a hooked end 21 that extends over and embraces the base of the spindle between the hub of the wheel and knuckle. This hook is retained tightly in place when the nuts of the U bolt are drawn tight and keeps the post from tilting in either direction.

It is readily apparent that devices of this character can be made in various sizes and altered in detail to conform to various types of cars without departing from the spirit of the invention. The device, as an integral structure, is very serviceable and can be easily applied or removed and in comparison with other types of brackets can be made at a relatively small cost.

Having thus described my invention, what I claim as new therein and desire to secure by Letters-Patent, is:

1. In a motor vehicle, the combination with a steering knuckle arm of a headlight mounting comprising a base portion adapted to be seated upon said arm and provided with a groove for receiving the same, means for securing the base to the arm, a vertical standard on said base adapted for the support of a headlight and an extension on the base adapted to engage a part of the knuckle as a steadying brace for the mounting.

2. In a motor vehicle, the combination with a steering knuckle equipped with a spindle and a steering arm, of a headlight mounting comprising a base portion adapted to seat upon and to be fixed to said arm, a standard on said base for the support of a headlight and a hooked arm extended from the base for embracing the spindle.

3. In a motor vehicle, the combination with a steering knuckle having a spindle and a steering arm extended therefrom, of a headlight mounting bracket comprising a base portion adapted to seat upon the said steering arm and having a groove for receiving the arm and having openings at its sides, a U-bolt applied about said arm and to said openings for securing the bracket in place, a standard on said base adapted for the mounting of a headlight thereon and a hooked arm extended from the base and about the spindle.

4. In combination, a steering knuckle having a spindle and a steering arm, a headlight mounting comprising a base member adapted to seat upon said steering arm and provided with a groove for receiving the same, a U-bolt encircling the arm and fixed to said base to retain it in place, an arm extended from the base, and having a hooked end overlying the spindle, a standard on the base, and a headlight adjustable vertically on the standard.

Signed at Seattle, King County, Washington, this 11th day of May 1925.

WILLIAM V. VAN ETTEN.